US009966101B1

(12) United States Patent
Chung et al.

(10) Patent No.: US 9,966,101 B1
(45) Date of Patent: May 8, 2018

(54) OPTICAL DISK DRIVE WITH MULTIPLE OPTICAL PICK-UP HEADS

(71) Applicants: LITE-ON ELECTRONICS (GUANGZHOU) LIMITED, Guangzhou (CN); LITE-ON TECHNOLOGY CORPORATION, Taipei (TW)

(72) Inventors: Ming-Hung Chung, Taipei (TW); Howard Yuen-Ho Shaw, Taipei (TW); Ming-Chun Tsao, Taipei (TW); Shih-Ming Hsu, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days. days.

(21) Appl. No.: 15/641,464

(22) Filed: Jul. 5, 2017

(30) Foreign Application Priority Data

Apr. 13, 2017 (CN) .......................... 2017 1 0239479

(51) Int. Cl.

| G11B 17/04 | (2006.01) |
|---|---|
| G11B 7/14 | (2012.01) |
| G11B 33/02 | (2006.01) |
| G11B 19/20 | (2006.01) |
| G11B 7/004 | (2006.01) |
| G11B 17/047 | (2006.01) |

(52) U.S. Cl.
CPC ................ *G11B 7/14* (2013.01); *G11B 7/004* (2013.01); *G11B 17/047* (2013.01); *G11B 19/2009* (2013.01); *G11B 33/027* (2013.01)

(58) Field of Classification Search
None
See application file for complete search history.

(56) References Cited

U.S. PATENT DOCUMENTS

| 4,788,671 A | * | 11/1988 | Kanda ................. G11B 7/0037 360/86 |
|---|---|---|---|
| 5,157,648 A | * | 10/1992 | Okamoto ........... G11B 7/08594 369/195 |
| 5,251,201 A | * | 10/1993 | Nomura ................... G11B 7/08 369/195 |
| 5,521,899 A | * | 5/1996 | Taki ................... G11B 17/0434 369/199 |
| 5,995,466 A | * | 11/1999 | Lee ........................ G11B 7/121 369/71 |

(Continued)

FOREIGN PATENT DOCUMENTS

| JP | 05189851 A | * | 7/1993 |
|---|---|---|---|
| JP | 08249674 A | * | 9/1996 |

(Continued)

*Primary Examiner* — William J Klimowicz
(74) *Attorney, Agent, or Firm* — McClure, Qualey & Rodack, LLP

(57) ABSTRACT

An optical disk drive is provided. The optical disk drive includes a first carrying member disposed on a base, and a second carrying member disposed on an upper cover. The first carrying member has a first optical pick-up head and a spindle motor. The second carrying member has a second optical pick-up head and a clamper rotatably disposed on the second carrying member. The clamper and the spindle motor together clamp an optical disk.

7 Claims, 6 Drawing Sheets

(56) References Cited

U.S. PATENT DOCUMENTS

| | | | | |
|---|---|---|---|---|
| 6,021,100 | A * | 2/2000 | Fujita | G11B 11/10532 |
| | | | | 369/13.11 |
| 7,188,349 | B2 * | 3/2007 | Ezawa | G11B 7/08 |
| | | | | 720/669 |
| 7,890,968 | B2 * | 2/2011 | Leigh | G11B 7/08594 |
| | | | | 347/242 |
| 7,933,191 | B2 * | 4/2011 | Van Brocklin | G11B 17/056 |
| | | | | 369/195 |
| 2008/0101184 | A1 * | 5/2008 | Van Brocklin | G11B 17/056 |
| | | | | 369/47.49 |
| 2008/0184278 | A1 * | 7/2008 | Leigh | G11B 7/08582 |
| | | | | 720/601 |
| 2014/0310731 | A1 * | 10/2014 | Takasawa | G11B 17/0284 |
| | | | | 720/604 |
| 2014/0310732 | A1 * | 10/2014 | Goto | G11B 17/0284 |
| | | | | 720/604 |

FOREIGN PATENT DOCUMENTS

| | | | |
|---|---|---|---|
| JP | 08249714 A | * | 9/1996 |
| JP | 10011954 A | * | 1/1998 |
| JP | 10188456 A | * | 7/1998 |

* cited by examiner

OPTICAL DISK DRIVE WITH MULTIPLE OPTICAL PICK-UP HEADS

This application claims the benefit of People's Republic of China application Serial No. 201710239479.8, filed Apr. 13, 2017, the subject matter of which is incorporated herein by reference.

BACKGROUND OF THE INVENTION

Field of the Invention

The invention relates in general to an optical disk drive, and more particularly to an optical disk drive with multiple optical pick-up heads.

Description of the Related Art

Along with the increase in data volume, a larger storage space is required, and the storage space of optical disk must be increased. Therefore, an optical disk whose both sides can store data is provided. Therefore, it has become a prominent task for the industry to provide a new type of optical disk drive capable of reading data stored on both sides of the optical disk.

SUMMARY OF THE INVENTION

The invention is directed to an optical disk drive capable of reading data stored on both sides of the optical disk.

According to one embodiment of the present invention, an optical disk drive is provided. The optical disk drive includes an upper cover, a base, a first carrying member, a first optical pick-up head, a spindle motor, a second carrying member, a second optical pick-up head, and a clamper. The base is disposed under the upper cover. The first carrying member is disposed on the base. The first optical pick-up head is disposed on the first carrying member. The spindle motor is disposed on the first carrying member, and has a turntable. The second carrying member is disposed on the upper cover. The second optical pick-up head is disposed on the second carrying member. The clamper, rotatably disposed on the second carrying member, and the turntable together clamp an optical disk.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
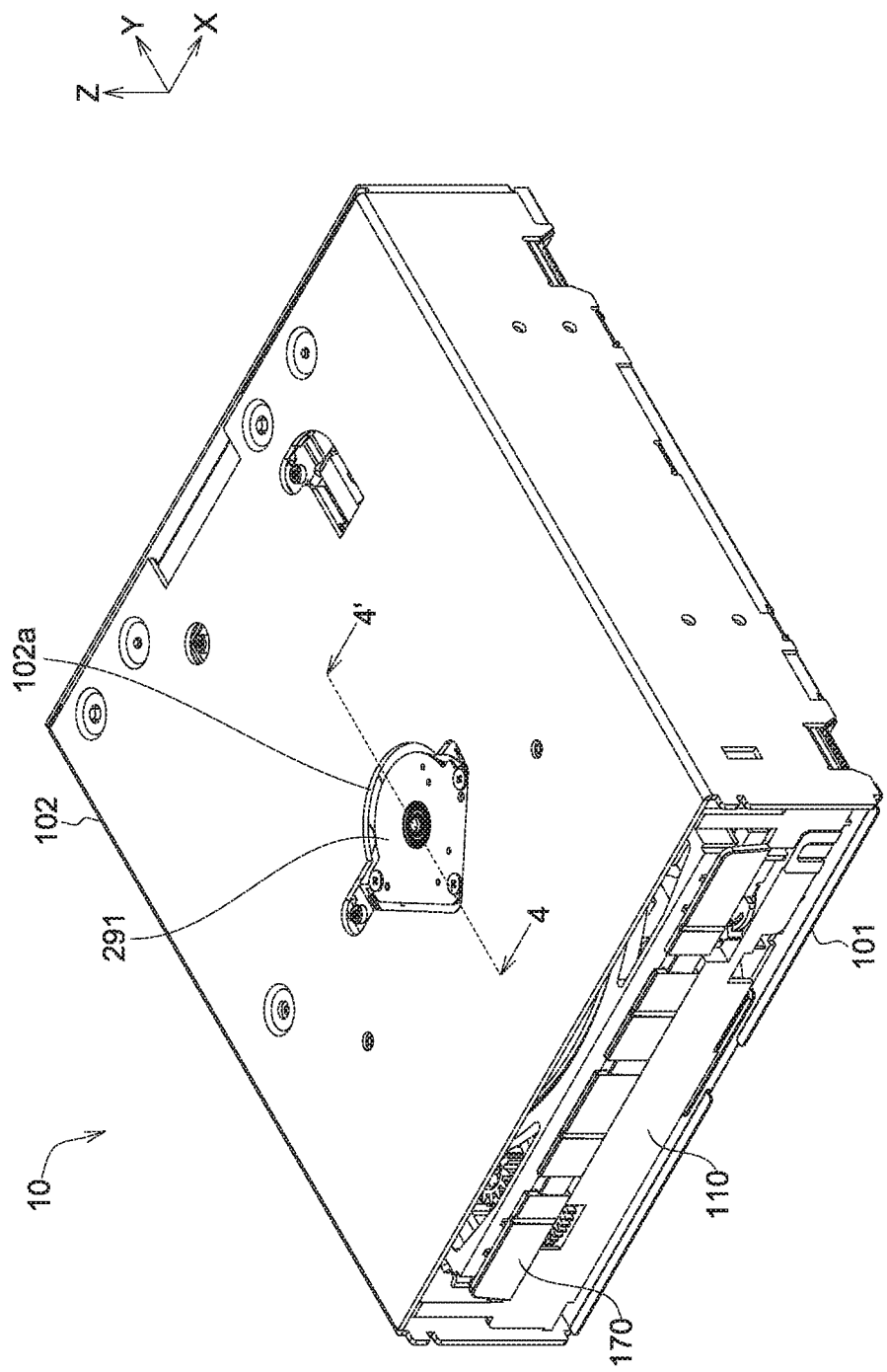
FIG. 1A is a schematic diagram of an optical disk drive according to an embodiment of the invention.
Figure 1B:
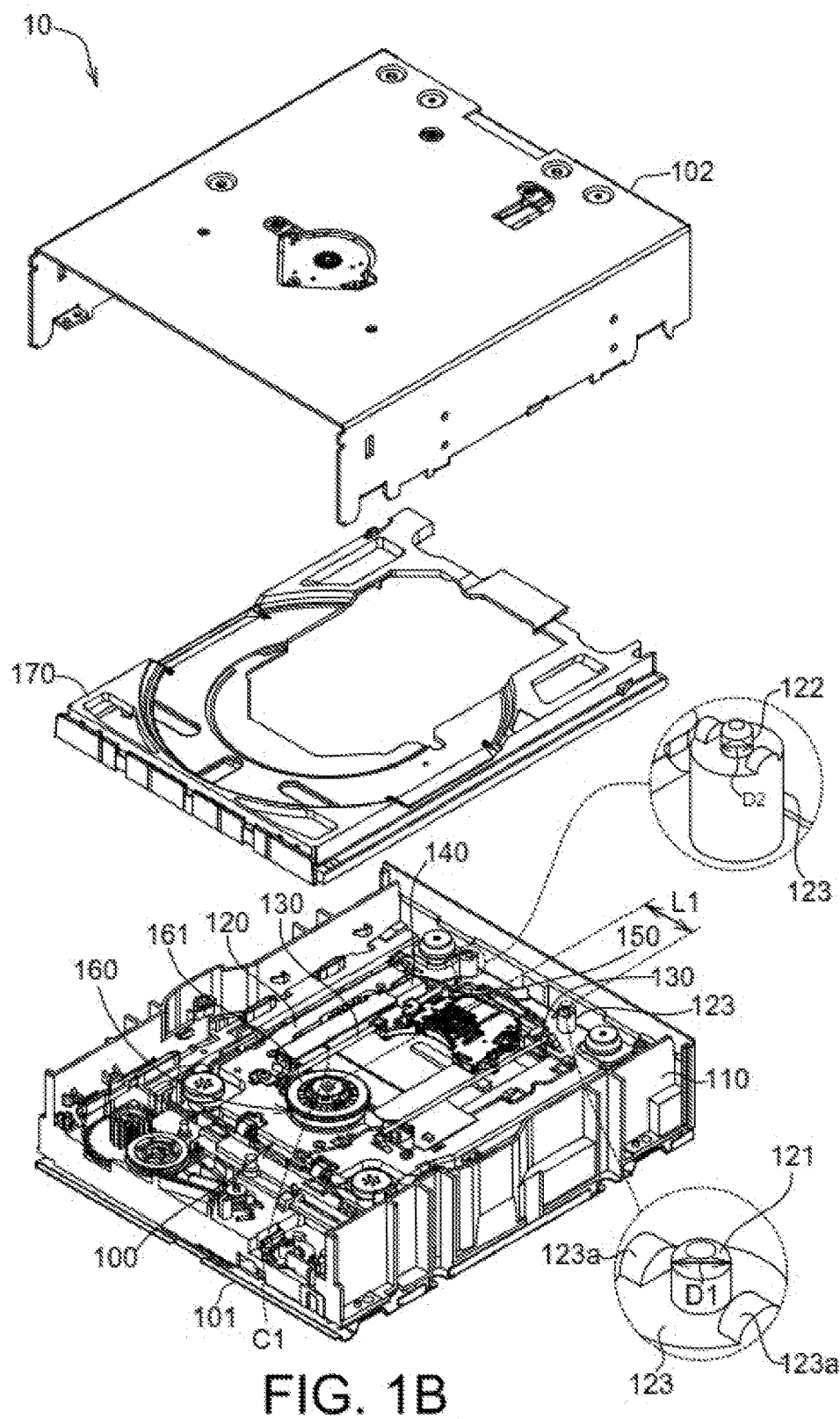
FIG. 1B is an explosion diagram of the optical disk drive of FIG. 1A.
Figure 2:
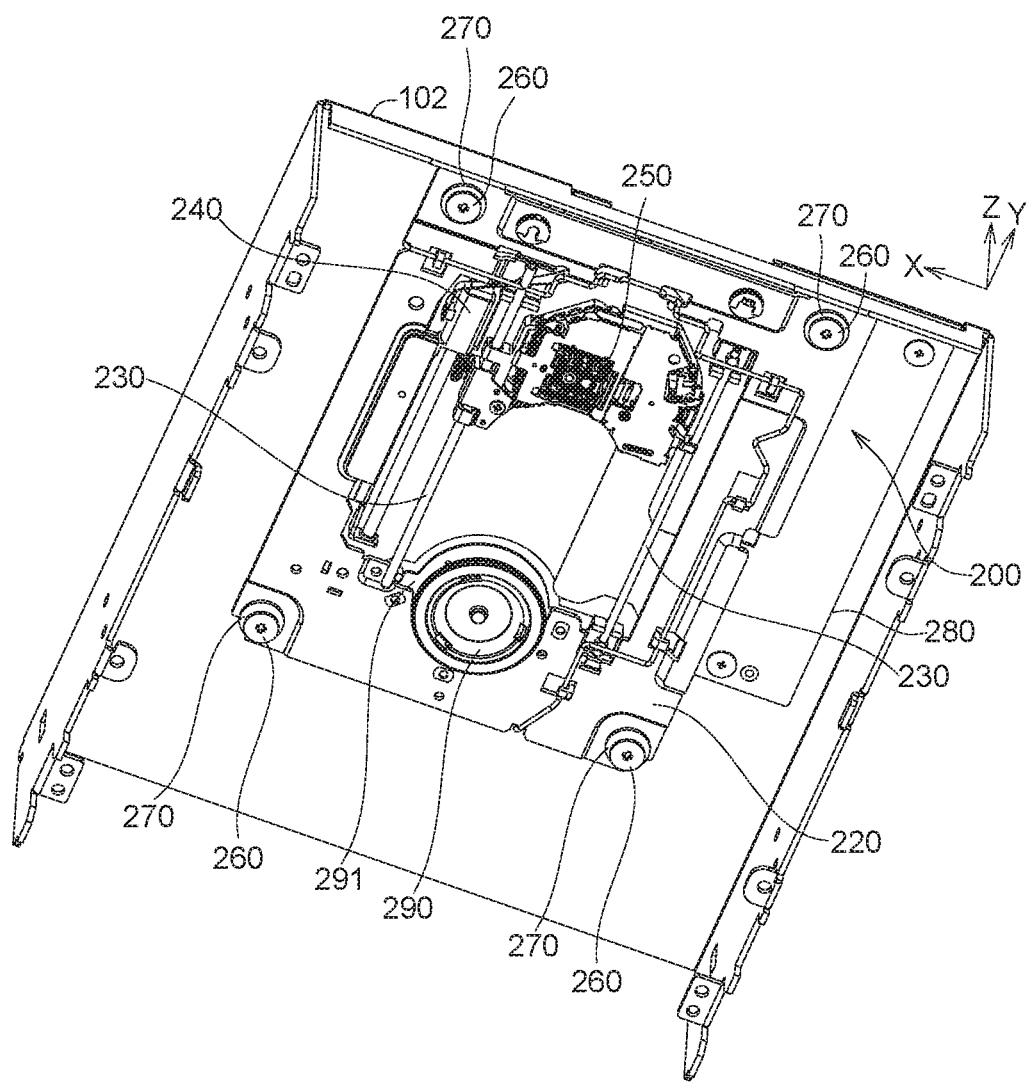
FIG. 2 is a schematic diagram of the upper body of FIG. 1A.

Refer to FIGS. 1A, 1B and 2. FIG. 1A is a schematic diagram of an optical disk drive 10 according to an embodiment of the invention. FIG. 1B is an explosion diagram of the optical disk drive 10 of FIG. 1A. FIG. 2 is a schematic diagram of the upper body 200 of FIG. 1A. The optical disk drive 10 includes a lower body 100 and an upper body 200, a base 110, a disk tray 170, a lower cover 101 and an upper cover 102. The base 110 is disposed between the lower cover 101 and the upper cover 102. The lower cover 101 can be realized by a bottom plate, and the upper cover 102 can be realized by a U-shaped plate. The base 110 can be realized by a frame for supporting the disk tray 170 and the lower body 100. The lower body 100 is disposed on the base 110. The upper body 200 is disposed on the upper cover 102. The disk tray 170 is slidably disposed on the base 110 for loading the optical disk 20 (illustrated in FIG. 4) into the optical disk drive 10.

The lower body 100 includes a first carrying member 120, at least a first sliding rail 130, a first driver 140, a first optical pick-up head 150 and a spindle motor 160. The first carrying member 120 is disposed on the base 110. The first sliding rail 130 is disposed on the first carrying member 120. The first optical pick-up head 150 is slidably disposed on the first sliding rail 130. The first driver 140 is disposed on the first carrying member 120 for moving the first optical pick-up head 150 to a read position along the first sliding rail 130. The first driver 140 can be realized by a motor. The spindle motor 160 is disposed on the first carrying member 120 and has a turntable 161 for supporting the optical disk. The spindle motor 160 drives the turntable 161 and the optical disk 20 supported on the turntable 161 to rotate together, such that the first optical pick-up head 150 can read data stored in different areas of the optical disk 20.

As shown in the drawings, the X, Y and Z directions are vertical to each other, wherein the disk tray 170 can be movably disposed on the base 110 along the +/−Y direction. For example, the disk tray 170 is loaded into the optical disk drive 10 along the +Y direction or is unloaded off the optical disk drive 10 along the −Y direction. Besides, the first carrying member 120 can be made of a metal and can be formed by the stamping method.

Figure 3:
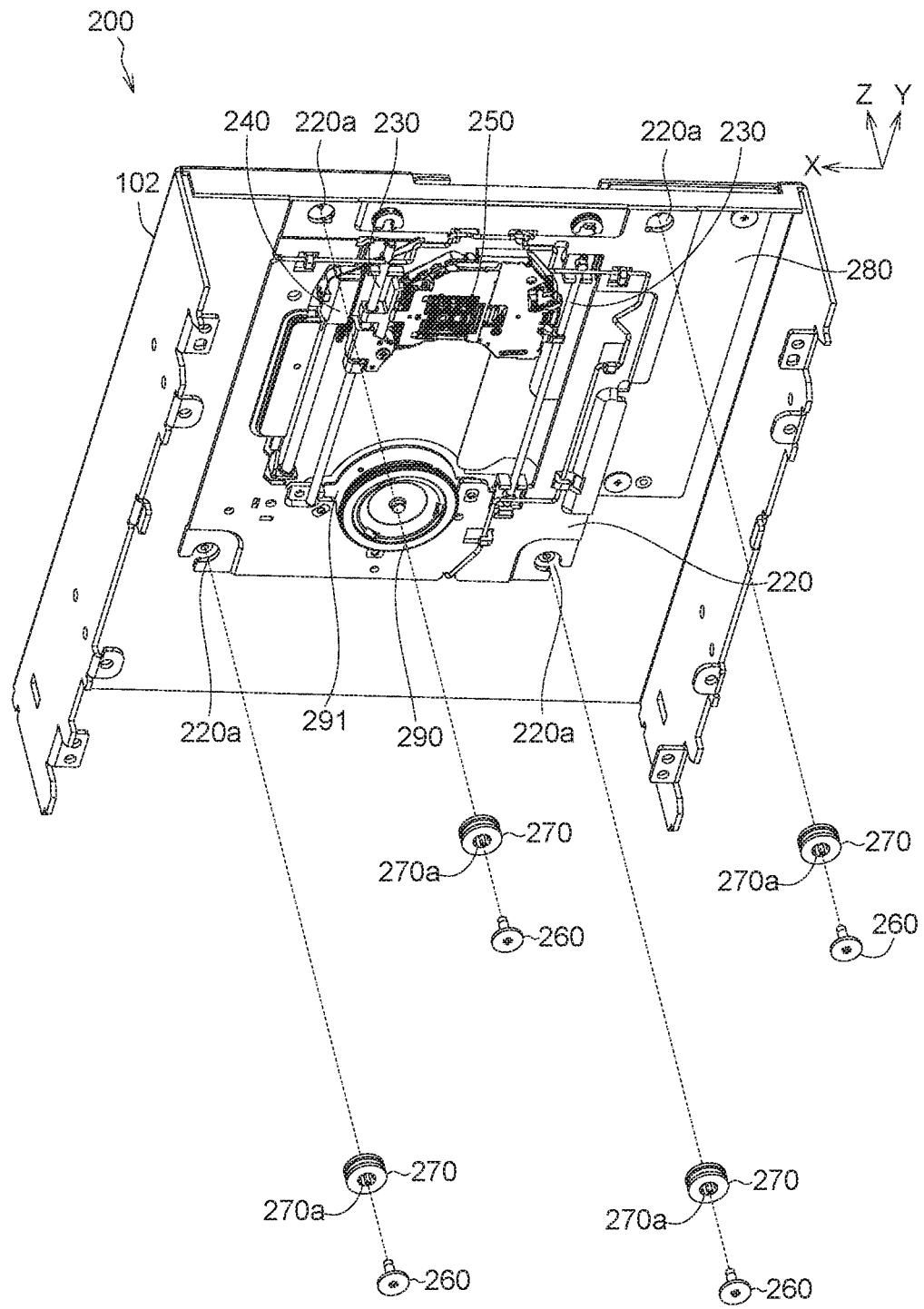
FIG. 3 is an explosion diagram of the upper body of FIG. 2.

Refer to FIGS. 2 and 3. FIG. 3 is an explosion diagram of the upper body of FIG. 2.

As indicated in FIG. 2, the upper body 200 includes a second carrying member 220, at least a second sliding rail 230, a second driver 240, a second optical pick-up head 250, at least a limiting member 260 and at least a buffering member 270, a circuit board 280 and a clamper 290. The second carrying member 220 is disposed on the upper cover 102. The material and formation method of the second carrying member 220 are similar to that of the first carrying member 120, and the similarities are not repeated here. The second sliding rail 230 is disposed on the second carrying member 220, and the second optical pick-up head 250 is slidably disposed on the second sliding rail 230. The second driver 240 is disposed on the second carrying member 220 for moving the second optical pick-up head 250 to a read position along the second sliding rail 230. The second driver 240 can be realized by a motor. The clamper 290 is rotatably disposed on the second carrying member 220 for clamping the optical disk loaded on the turntable 161.

As indicated in FIG. 3, the second carrying member 220 has at least an opening 220a. The buffering member 270 is mounted in the opening 220a and has a via 270a. The limiting member 260 can pass through the via 270a of the buffering member 270 to fix the second carrying member 220 on the upper cover 102.

Figure 4:
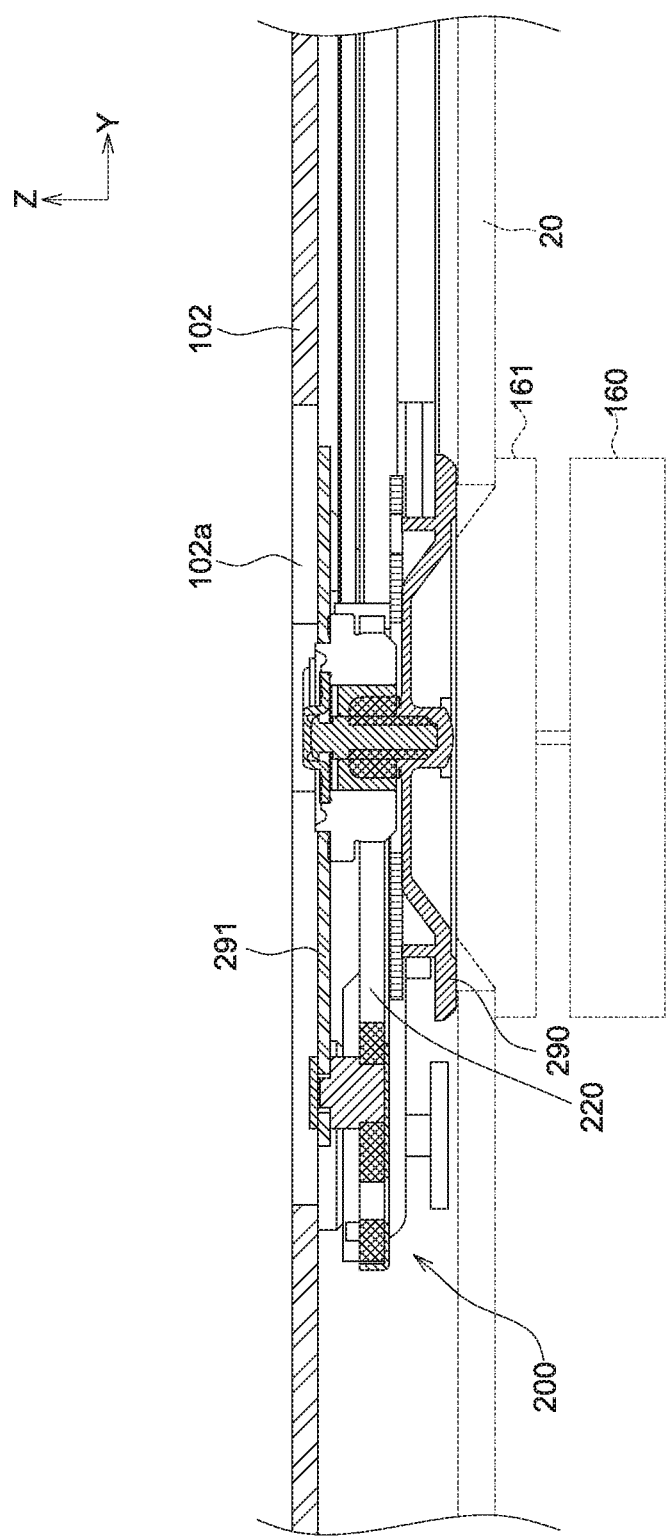
FIG. 4 is a cross-sectional view of the optical disk drive of FIG. 1A along direction 4-4'.

Refer to FIGS. 3 and 4. FIG. 4 is a cross-sectional view of the optical disk drive of FIG. 1A along direction 4-4'. FIG.

4 also shows the optical disk 20 (illustrated in dotted lines) being clamped between the turntable 161 (illustrated in dotted lines) of the spindle motor 160 and the 290. The adapting member 291 can be fixed on the second carrying member 220 by screws. The upper cover 102 has a penetrating portion 102a corresponding to the adapting member 291. The clamper 290 is pivotally connected to the adapting member 291 and disposed on the second carrying member 220 through the adapting member 291. In another embodiment, the clamper 290 can be pivotally connected to the second carrying member 220 directly.

In the present embodiment, since the clamper 290 can be rotatably disposed on the second carrying member 220, the optical disk 20 and the clamper 290 can be driven to rotate through the clamping relationship between the turntable 161 of the spindle motor 160, the optical disk 20 and the clamper 290 without additionally disposing another spindle motor. The clamper 290, the disc tray 161 and the optical disk 20 have the same rotation speed.

During the assembly process, the clamper 290 is assembled on the adapting member 291 first, and then the clamper 290 and the adapting member 291 together are assembled on the second carrying member 220. Alternatively, the adapting member 291 is assembled on the second carrying member 220 first, and then the clamper 290 is assembled on the adapting member 291.

Refer to FIG. 3. The circuit board 280 is disposed on the upper cover 102. In one embodiment, the circuit board 280 is disposed on the upper cover 102 and interposed between the upper cover 102 and the second carrying member 220. The circuit board 280 is electrically connected to the second optical pick-up head 250 and the second driver 240, such that an external signal (not illustrated) can operate the second driver 240 and the second optical pick-up head 250 through the circuit board 280.

Figure 5:
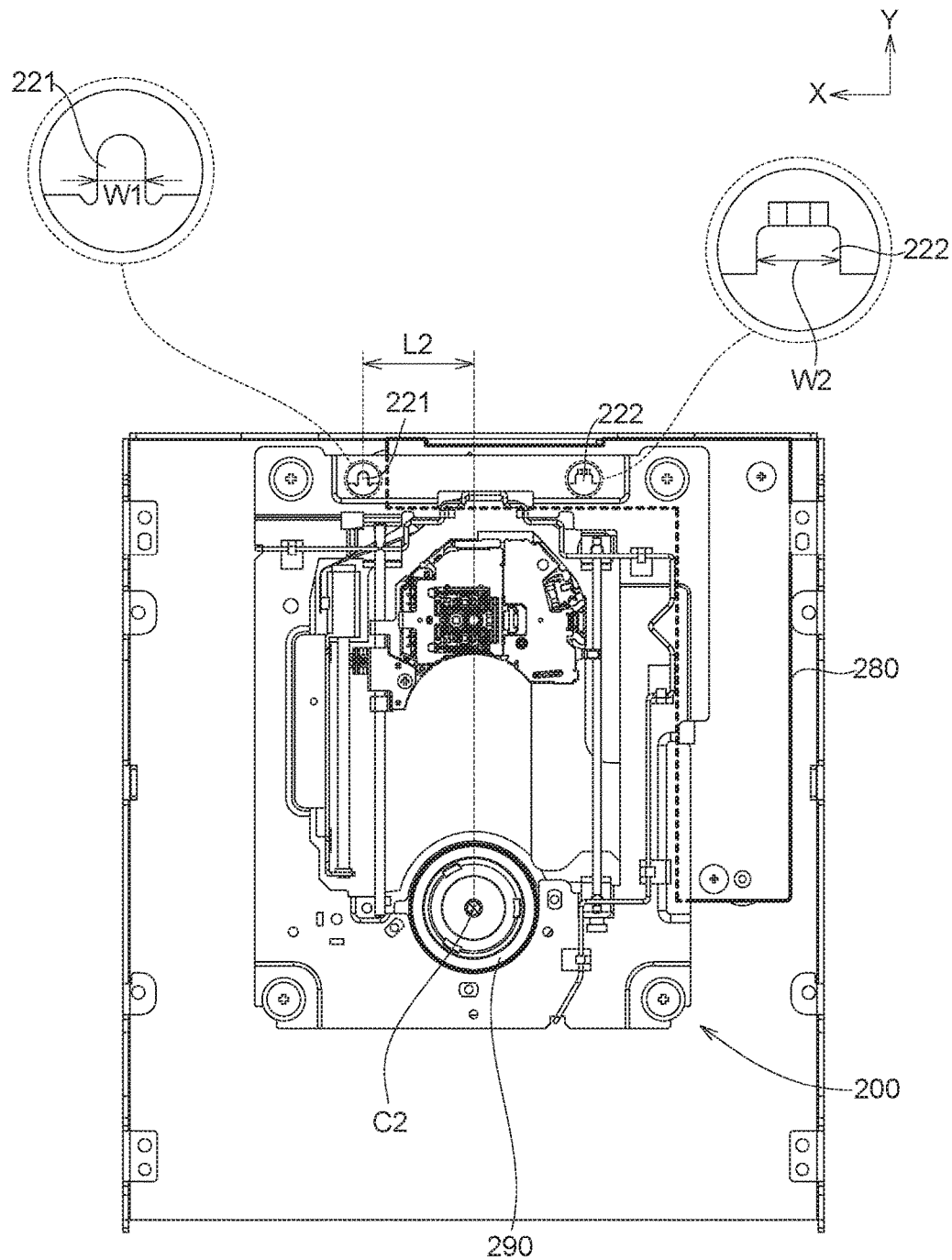
FIG. 5 is a bottom view of the upper body of FIG. 1A.

Refer to FIG. 1B and FIG. 5. FIG. 5 is a bottom view of the upper body 200 of FIG. 1A. As indicated in FIG. 1B, the lower body 100 further includes a first aligning portion 121 disposed on the first carrying member 120. As indicated in FIG. 5, the upper body 200 further includes a second aligning portion 221 disposed on the second carrying member 220, wherein the second aligning portion 221 corresponds to the first aligning portion 121. In the present embodiment, the first aligning portion 121 can be realized by a protruded portion, and the second aligning portion 221 can be realized by a recess. In another embodiment, the first aligning portion 121 can be realized by a recess, and the second aligning portion 221 can be realized by a protruded portion. When the turntable 161 of the lower body 100 lifts the optical disk 20 from the disk tray 170 (along the +2 direction) and clamps the optical disk 20 with the clamper 290 of the upper body 200, the first aligning portion 121 and the second aligning portion 221 are aligned with each other.

Let the first aligning portion 121 be exemplified by a protruded portion, and the second aligning portion 221 be exemplified by a recess. As indicated in FIGS. 1B and 5, the second aligning portion 221 has a recess width W1 along the X direction, and the outer diameter D1 of the first aligning portion 121 is substantially equal to the recess width W1 of the second aligning portion 221. Thus, during the process of lifting the turntable 161 of the lower body 100 (along the +Z direction) and clamping the optical disk 20 by the turntable 161 and the clamper 290 of the upper body 200, the first aligning portion 121 is limited within the second aligning portion 221, and relative position between the upper body 200 and the lower body 100 is also limited.

As indicated in FIGS. 1B and 5, the length L1 of the projection of the distance between the first aligning portion 121 and the center C1 of the spindle motor 160 on a first axis (such as the X direction) is substantially equal to the length L2 of the projection of the distance between the second aligning portion 221 and the center C2 of the clamper 290 on the first axis. Thus, when the second aligning portion 221 of the upper body 200 and the first aligning portion 121 of the lower body 100 are aligned with each other, relative position between the upper body 200 and the lower body 100 can be positioned correctly, and the second optical pick-up head 250 of the upper body 200 and the first optical pick-up head 150 of the lower body 100 will be able to correctly read data from the optical disk.

In an embodiment, when relative position between the upper body 200 and the lower body 100 is positioned correctly, the second optical pick-up head 250 and the first optical pick-up head 150 can be aligned with each other, and the second optical pick-up head 250 and the first optical pick-up head 150 can concurrently read data stored at the corresponding position on the corresponding data side of the optical disk.

As indicated in FIGS. 1B and 5, the lower body 100 further includes a third aligning portion 122 disposed on the first carrying member 120, and the upper body 200 further includes a fourth aligning portion 222 disposed on the second carrying member 220. When the turntable 161 of the lower body 100 lifts the optical disk 20 from the disk tray 170 (+Z direction) and clamps the optical disk 20 with the clamper 290 of the upper body 200, the third aligning portion 122 and the fourth aligning portion 222 are aligned with each other. In the present embodiment, the third aligning portion 122 can be realized by a protruded portion, and the fourth aligning portion 222 can be realized by a recess. In another embodiment the third aligning portion 122 can be realized by a recess, and the fourth aligning portion 222 can be realized by a protruded portion. Suppose the third aligning portion 122 is exemplified by a protruded portion, and the fourth aligning portion 222 is exemplified by a recess. As indicted in FIGS. 1B and 5, the fourth aligning portion 222 has a recess width W2 along the X direction, and the outer diameter D2 of the third aligning portion 122 is smaller than the recess width W2 of the fourth aligning portion 222 such that the lower body 100 and the upper body 200 will not be over-limited during the process of clamping the optical disk.

As indicated in FIGS. 1B and 5, the lower body 100 further includes at least a positioning column 123 disposed on the first carrying member 120. When the turntable 161 of the lower body 100 and the clamper 290 of the upper body 200 clamp the optical disk 20, the positioning column 123 can lean on the second carrying member 220 of the upper body 200, such that the lower body 100 and the upper body 200 are separated by a positioning distance, which is determined according to the height of the positioning column 123. In an embodiment, the positioning column 123 has a protruded leaning portion 123a, and when the turntable 161 of the lower body 100 and the clamper 290 of the upper body 200 clamp the optical disk 20, the leaning portion 123a leans on the second carrying member 220 of the upper body 200, such that the lower body 100 and the upper body 200 are separated by a positioning distance (along the Z direction). In an embodiment, the first aligning portion 121 and/or the third aligning portion 122 are disposed on such as an end surface of the positioning column 123 facing the second carrying member 220.

The optical disk drive of the invention additionally includes an upper body and a second optical pick-up head disposed on the upper body, such that the optical disk drive can concurrently read the data stored on both sides of the optical disk. For the first optical pick-up head and the second optical pick-up head to correctly read the optical disk, the aligning portion of the upper body must match the aligning portion of the lower body, such that when the aligning portion of the upper body and the aligning portion of the lower body are aligned with each other, relative position between the upper body and the lower body can be positioned correctly. Moreover, the positioning distance between the lower body and the upper body is determined according to the height of the positioning column disposed on the lower body or the upper body.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical disk drive, comprising:
   an upper cover;
   a base disposed under the upper cover, wherein there is no movement between the upper cover and the base;
   a first carrying member disposed on the base;
   a first optical pick-up head disposed on the first carrying member;
   a spindle motor disposed on the first carrying member and having a turntable;
   a second carrying member directly disposed on the upper cover through at least a limiting member and at least a buffering member;
   a second optical pick-up head disposed on the second carrying member; and
   a clamper rotatably disposed on the second carrying member, wherein the turntable is lifted to clamp an optical disk with the clamper.

2. The optical disk drive according to claim 1, further comprising a circuit board interposed between the upper cover and the second carrying member and electrically connected to the second optical pick-up head.

3. The optical disk drive according to claim 1, further comprising a positioning column disposed on the first carrying member, and the positioning column leans on the second carrying member when the turntable and the clamper clamp the optical disk.

4. The optical disk drive according to claim 3, wherein the positioning column has a protruded leaning portion, and the leaning portion leans on the second carrying member when the turntable and the clamper clamp the optical disk.

5. An optical disk drive, comprising:
   an upper cover;
   a base disposed under the upper cover;
   a disk tray slidably disposed on the base along a sliding direction;
   a first carrying member disposed on the base;
   a first optical pick-up head disposed on the first carrying member;
   a spindle motor disposed on the first carrying member and having a turntable;
   a second carrying member disposed on the upper cover;
   a second optical pick-up head disposed on the second carrying member; and
   a clamper rotatably disposed on the second carrying member, wherein the clamper and the turntable together clamp an optical disk,
   wherein the first carrying member comprises a first aligning portion, the second carrying member comprises a second aligning portion, and the first aligning portion and the second aligning portion are aligned with each other when the turntable and the clamper clamp the optical disk,
   wherein there is a projection distance between the first aligning portion and the spindle motor projecting on a first axis, wherein the first axis and the sliding direction are orthogonal.

6. The optical disk drive according to claim 5, wherein the first carrying member further comprises a third aligning portion, and the first aligning portion and the third aligning portion are located at the same side of the spindle motor.

7. The optical disk drive according to claim 5, wherein the first aligning portion and the second aligning portion are a protruded portion and a recess respectively, wherein the recess has a recess width, and an outer diameter of the protruded portion is equal to the recess width, wherein the recess has an opening facing the clamper along the sliding direction.

* * * * *